July 15, 1924.
C. W. BEAUCHAMP
1,501,302
CHAIN LOCK
Filed Oct. 15, 1923
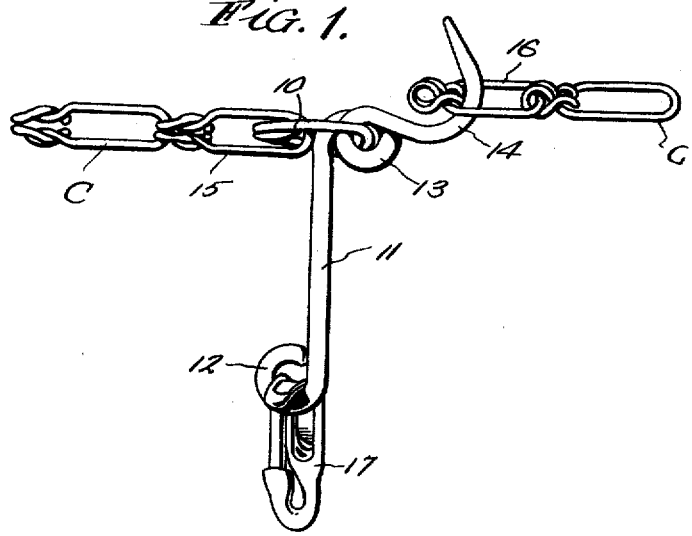
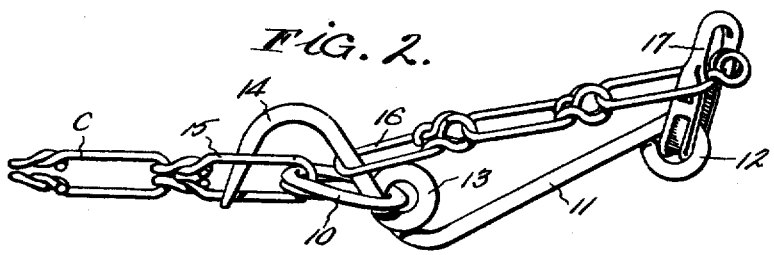
Witnesses:
CLARK W. BEAUCHAMP, Inventor
By Richard B. Owen, Attorney Patented July 15, 1924.

1,501,302

UNITED STATES PATENT OFFICE.

CLARK W. BEAUCHAMP, OF SOMERS, MONTANA.

CHAIN LOCK.

Application filed October 15, 1923. Serial No. 668,746.

*To all whom it may concern:*

Be it known that I, CLARK W. BEAUCHAMP, a citizen of the United States, residing at Somers, in the county of Flathead and State of Montana, have invented certain new and useful Improvements in Chain Locks, of which the following is a specification.

This invention relates to chains, and especially the anti-skid chains of automobiles.

More particularly, the invention relates to a chain lock for securing the two ends of a chain together, or securing one end of a chain to the adjacent end of a second chain.

It is well understood by users of automobiles that much difficulty is experienced in securing the ends of the side chains of anti-skid devices together. These devices should fit tightly on the wheel, and when they do fit in this manner the side chains are brought under considerable strain, and both the locking and unlocking operation is ordinarily attended with much effort and annoyance.

The principal and most important object of the present invention is to provide an improved construction of chain lock especially adapted for the side chains of anti-skid devices, and which will quickly and easily bring the ends of such chains together and hold them securely in locked position.

A second important object of the invention is to provide a device of this description which may be cheaply and economically constructed and wherein the principal parts will be simply of heavy wire.

With the above and other objects in view as will be hereinafter apparent, the invention consists in general of certain novel details of construction and combinations of parts hereinafter more fully described, illustrated in the accompanying drawings, and specifically claimed.

In the accompanying drawings like characters of reference indicate like parts in the several views, and:

Fig. 1 is a side elevation of the improved device shown in connection with adjacent ends of the side chains of anti-skid devices, the view showing the unlocked position.

Fig. 2 is a view similar to Fig. 1, but showing the locked position.

Fig. 3 is a detail edge view of the main member of the device.

In the embodiment of the invention herein illustrated, there is disclosed a chain C having an end link 10 whereon is pivoted the main member of the improved lock. This main member consists of a length of wire having a straight portion 11 forming a locking lever. At one extremity of the straight portion, this wire is bent to constitute an eye 12, while at the other extremity of the straight portion, the wire is bent to form an eye 13 engaging the link 10. From the eye 13 the wire is continued at an acute angle to the locking lever part 11 and bent to form a hook 14 which thus is approximately at right angles to the lever 11. The bill of this hook is of such length and so positioned that, with the device in locking position, the bill will engage in the link 15 next to the link 10 on the chain.

In using the device the hook 14 is also engaged through the end link 16 at the other end of the chain, and it will be seen by an inspection of Figures 1 and 2 that when thus engaged, the links 10 and 16 are separated to a considerable extent provided the lever 11 is in unlocked position. However, when the lever 11 is moved to locked position as in Fig. 2, the links 16 and 10 are drawn to overlapped position, and thus the chain is tightened.

Carried by the eye 12 is a snap hook 17, which is used to engage the chain C adjacent the link 16 when the device is locked. and thus prevents unlocking of the device accidentally. Moreover, it will be observed from Fig. 2 that with the device in locked position, the link 16 cannot be disengaged from the bill 14 because of the peculiar relationship of the point of that bill with the link 15.

Now it is obvious that the lever 11 may be as long as desired, and that thus the chain may be tightened with very little exertion and strength on the part of the user, and also that it may be released with great ease when it is desired to remove the device from the wheel.

There has thus been provided a simple and efficient device of the kind described and for the purpose specified.

It is obvious that minor changes may be made in the form and construction of the invention without in any way departing from the material spirit thereof. It is not, therefore, desired to confine the invention to the exact form herein shown and described, but it is wished to include all such as properly come within the scope claimed.

Having thus described the invention, what is claimed as new, is:

1. The combination with a link chain: of a locking device for coupling adjacent chain ends together comprising a single locking lever having pivotal connection at a point intermediate its ends to an end link of the chain and provided with a lever arm at one side of the pivotal connection and a hook at the other side of the pivotal connection arranged at right angles to the lever arm, said hook being arranged for engagement with the other end link of the chain to draw the same into overlapping relation with the first end link, and means to latch the arm to the chain adjacent said second end link.

2. The combination with a link chain: of a locking device for coupling adjacent chain ends together comprising a single locking lever having pivotal connection at a point intermediate its ends to an end link of the chain and provided with a lever arm at one side of the pivotal connection and a hook at the other side of the pivotal connection arranged at right angles to the lever arm, said hook being arranged for engagement with the other end link of the chain to draw the same into overlapping relation with the first end link, said hook having a bill arranged to enter the next link to the first mentioned end link whereby to prevent accidental disengagement of the second mentioned end link, and means to latch the arm to the chain adjacent said second end link.

3. The combination with a link chain: of a locking device for coupling adjacent chain ends together comprising a locking lever having pivotal connection to an end link of the chain and provided with a lever arm at one end and a hook at the other end arranged at right angles to the lever arm, said hook being arranged for engagement with the other end link of the chain to draw the same into overlapping relation with the first end link, said hook having a bill arranged to enter the next link to the first mentioned end link whereby to prevent accidental disengagement of the second mentioned end link, and a snap hook carried by the end of the arm and engageable with a portion of the chain adjacent the second mentioned end link.

In testimony whereof I affix my signature in presence of two witnesses.

CLARK W. BEAUCHAMP.

Witnesses:
G. W. NOFFSINGER,
LILLIAN J. LEE.